United States Patent
Yoshida et al.

(10) Patent No.: US 8,674,562 B2
(45) Date of Patent: Mar. 18, 2014

(54) LINEAR MOTOR ARMATURE AND LINEAR MOTOR

(75) Inventors: Shusaku Yoshida, Fukuoka (JP); Yuji Nitta, Fukuoka (JP); Katsuhiko Shiraishi, Fukuoka (JP); Kazuyuki Shiono, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 250 days.

(21) Appl. No.: 13/218,529

(22) Filed: Aug. 26, 2011

(65) Prior Publication Data

US 2012/0049658 A1  Mar. 1, 2012

(30) Foreign Application Priority Data

Aug. 27, 2010 (JP) ................................ 2010-190466
Jan. 7, 2011 (JP) ................................ 2011-002511

(51) Int. Cl.
  *H02K 41/02* (2006.01)
(52) U.S. Cl.
  USPC ........................................................ 310/12.29
(58) Field of Classification Search
  USPC ................. 310/12.01–12.33, 52, 54, 58, 64
  See application file for complete search history.

(56) References Cited

U.S. PATENT DOCUMENTS

| | | | | |
|---|---|---|---|---|
| 5,959,732 A | * | 9/1999 | Hara et al. | 356/500 |
| 6,084,319 A | * | 7/2000 | Kamata et al. | 310/12.29 |
| 6,323,567 B1 | * | 11/2001 | Hazelton et al. | 310/12.29 |
| 6,956,308 B2 | * | 10/2005 | Binnard | 310/52 |
| 6,979,920 B2 | * | 12/2005 | Reynolds et al. | 310/54 |
| 7,355,308 B2 | * | 4/2008 | Hazelton | 310/58 |
| 8,450,885 B2 | * | 5/2013 | Yoshida et al. | 310/12.29 |
| 2004/0262999 A1 | | 12/2004 | Yoshida et al. | |
| 2005/0040712 A1 | | 2/2005 | Hazelton | |
| 2009/0315414 A1 | | 12/2009 | Shikayama et al. | |

FOREIGN PATENT DOCUMENTS

| | | |
|---|---|---|
| JP | 2001-275334 | 10/2001 |
| JP | 2001-275337 | 10/2001 |
| JP | 2004-180361 | 6/2004 |
| WO | WO 03/005538 | 1/2003 |

OTHER PUBLICATIONS

Extended European Search Report for corresponding EP Application No. 11179036.6-1242, Oct. 19, 2012.

* cited by examiner

*Primary Examiner* — Nguyen N Hanh
(74) *Attorney, Agent, or Firm* — Ditthavong Mori & Steiner, P.C.

(57) ABSTRACT

A linear motor armature according to an embodiment includes an armature coil and a cooling jacket. The cooling jacket is provided to surround the armature coil and has an internal space into which a refrigerant is supplied. The cooling jacket is formed in a thin plate shape having a structure in which a channel for supplying the refrigerant is provided in a multiple manner in its thickness direction.

20 Claims, 8 Drawing Sheets

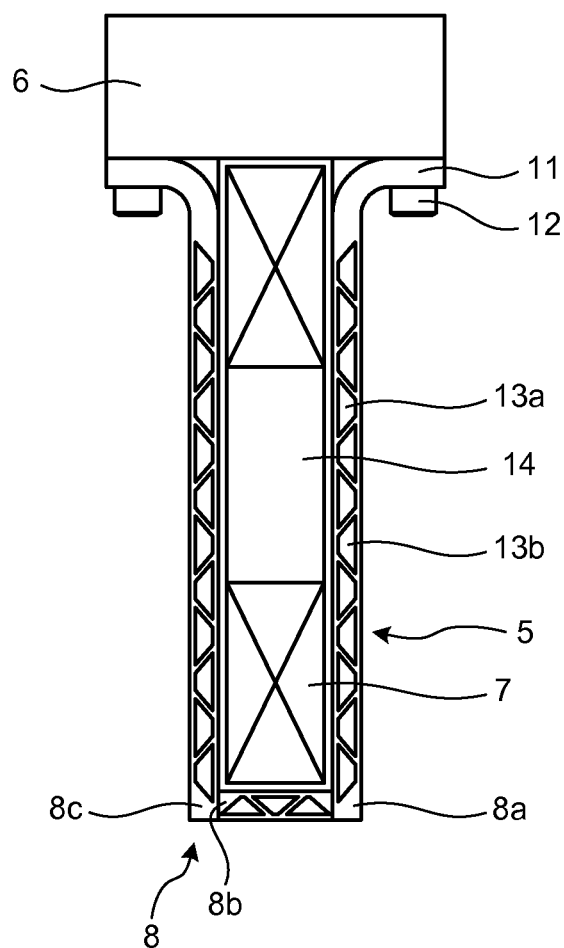

LINEAR MOTOR ARMATURE AND LINEAR MOTOR

CROSS-REFERENCE TO RELATED APPLICATIONS

This application is based upon and claims the benefit of priority from the prior Japanese Patent Application No. 2010-190466, filed on Aug. 27, 2010; and Japanese Patent Application No. 2011-002511, filed on Jan. 7, 2011, the entire contents of all of which are incorporated herein by reference.

FIELD

The disclosed embodiments relate to a linear motor armature and a linear motor.

BACKGROUND

Linear motors have been proposed which are used in factory automation (FA) equipment, for example, for driving a stage of a semiconductor exposure apparatus or a liquid-crystal exposure apparatus or feeding a table of a machining tool, aiming at high-speed feeding and machining and high-precision processing. A linear motor employing a so-called "dual cooling mechanism" is known as this type of linear motors. Related conventional technologies include a technique described in Japanese Patent No. 3459978.

A linear motor described in Japanese Patent No. 3459978 includes a magnet that forms a field pole, a coil that forms an armature arranged facing the magnet via a magnetic gap, a shell that contains the coil therein with a predetermined gap and cools down the coil by passing a refrigerant through the gap, and an outside cover that contains the shell therein with a predetermined gap and cools down the shell by passing the refrigerant through the gap. With this configuration, the refrigerant (in a low-temperature condition) is first introduced in the longitudinal direction of the coil through a first outside main channel formed between the coil and the shell, and then the refrigerant flows in the lateral direction through a second outside main channel formed between the shell and the outside cover after passing through the first outside main channel. The refrigerant is then supplied to the inside of the shell through the second outside main channel, and discharged to outside from a discharge tube flowing in the lateral direction along the surface of the coil (in a highest-temperature condition).

The conventional technique can suppress an increase in the surface temperature to some extent by the refrigerant cooling. However, when an increase of thrust force is aimed with a similar linear motor size, an increase in the surface temperature of the armature due to heat generated from the coil when applying a current to the armature to increase the thrust force can be hardly avoided, which causes a problem in enhancing cooling efficiency.

SUMMARY

A linear motor armature according to an aspect of the embodiment includes an armature coil and a cooling jacket. The cooling jacket is provided to surround the armature coil, and a refrigerant is supplied into its internal space. The cooling jacket is formed in a thin plate shape having a structure with multiple channels for supplying the refrigerant in its thickness direction.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 4 is a front cross-sectional view of a linear motor armature according to a modification of the first embodiment;

DESCRIPTION OF EMBODIMENTS

First, a first embodiment will be explained.

Figure 1:
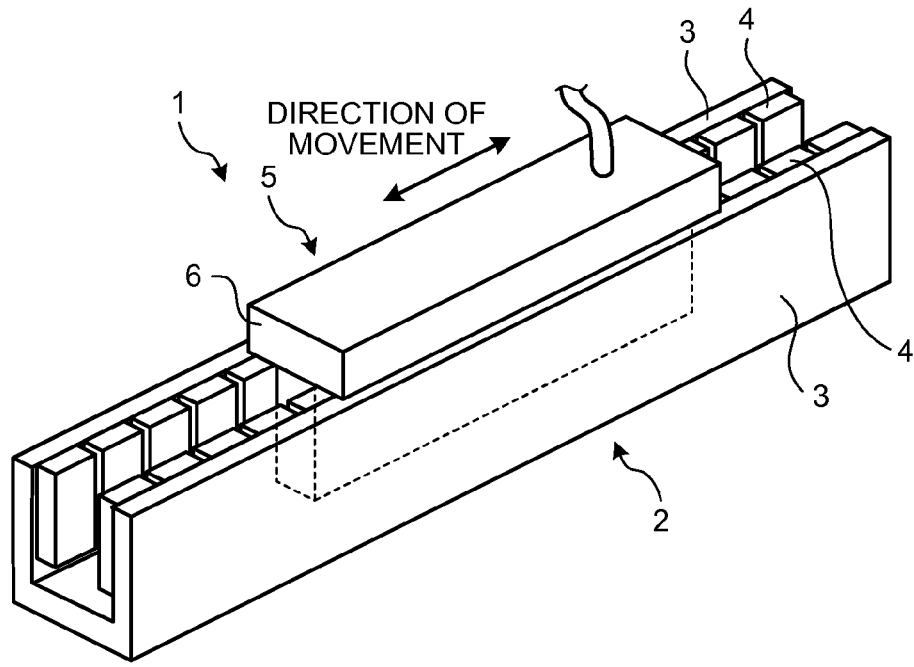
FIG. 1 is an overall perspective view of a linear motor to be used in a first embodiment.

FIG. 1 is an overall perspective view of a linear motor to be used in the first embodiment.

As shown in FIG. 1, a linear motor 1 subject to refrigerant cooling includes a field system 2, a yoke 3, field-system permanent magnets 4, an armature 5, and a base 6.

The linear motor 1 shown in FIG. 1 has a configuration in which the field system 2 including the field-system permanent magnets 4 arranged along the longitudinal direction on the yoke 3 made of a ferromagnetic material serves as a stator and the armature 5 arranged to face the field system 2 via a magnetic gap serves as a mover to relatively move the mover with respect to the stator.

Figure 2:
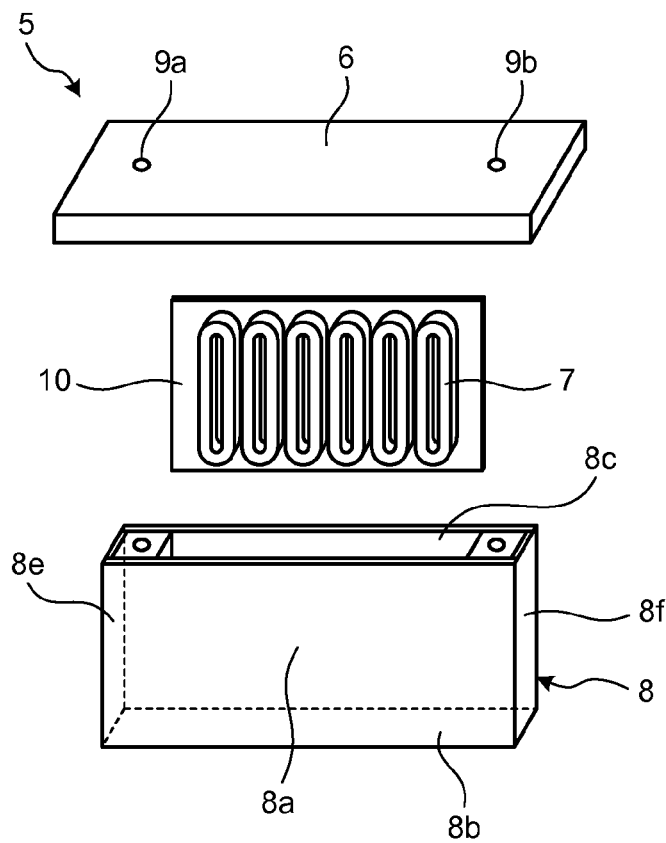
FIG. 2 is an exploded perspective view of a linear motor armature according to the first embodiment.

FIG. 2 is an exploded perspective view of the linear motor armature according to the first embodiment.

In FIG. 2, reference numeral 7 denotes an armature coil, 8 denotes a cooling jacket, 8a denotes a first cooling jacket, 8b denotes a second cooling jacket, 8c denotes a third cooling jacket, 8e denotes a fourth cooling jacket, 8f denotes a fifth cooling jacket, 9a denotes a refrigerant inlet, 9b denotes a refrigerant outlet, and 10 denotes a substrate.

As shown in FIG. 2, the armature 5 includes the cooling jacket 8 having an internal space into which a refrigerant is supplied, and the plate-like base 6 provided on a top surface among four surfaces of the cooling jacket 8 parallel to a direction of movement of the armature 5, thereby forming a so-called "T-shaped linear motor armature". Specifically, the armature 5 of the linear motor 1 includes the armature coil 7 fixed on the substrate 10, the cooling jacket 8 of a box shape inserted to surround the armature coil 7 and formed by connecting in a box shape three surfaces (the cooling jackets 8a, 8b, and 8c) parallel to the movement direction of the armature 5 and two surfaces (the cooling jackets 8e and 8f) perpendicular to the movement direction of the armature 5 to face each other, and the base 6 of a single plate shape.

Figure 3:
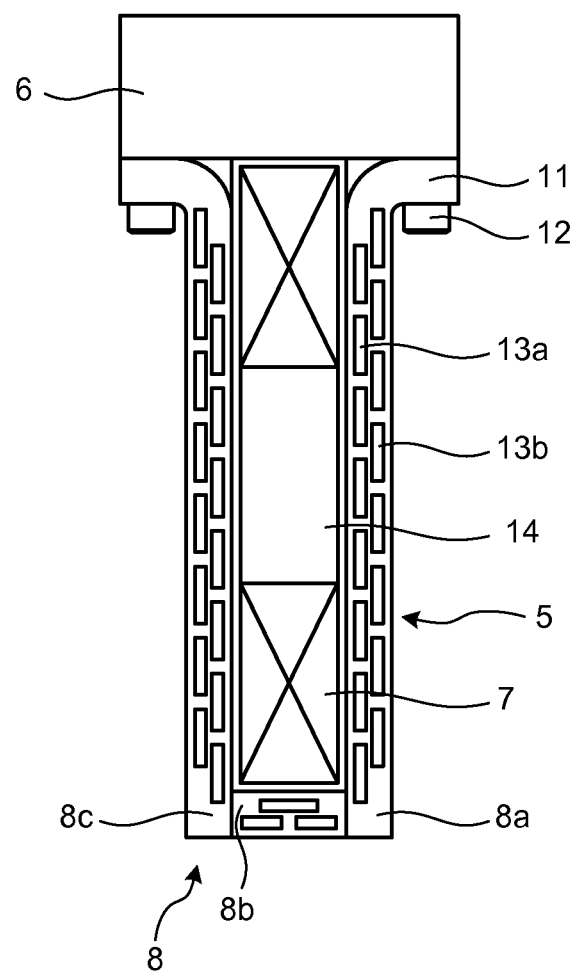
FIG. 3 is a front cross-sectional view of the linear motor armature according to the first embodiment.

FIG. 3 is a front cross-sectional view of the linear motor armature according to the first embodiment.

As shown in FIG. 3, the armature 5 further includes a flange 11, screws 12, inner refrigerant channels 13a, and outer refrigerant channels 13b.

According to the first embodiment, in the armature 5 having the armature coil 7, the cooling jacket 8 including channels therein, and the base 6, the armature coil 7 is integrated with the cooling jacket 8 by being fixed with a resin mold 14 as shown in FIG. 3 or bonded with a bonding adhesive (not shown) to be closely attached to an inner side of the cooling jacket 8.

As shown in FIG. 3, in the cooling jacket 8 of a box shape formed by connecting two surfaces (two surfaces located in the front and back in FIG. 3, the cooling jackets 8e and 8f) perpendicular to the movement direction of the armature 5 and three surfaces (the cooling jackets 8a, 8b, and 8c) parallel to the movement direction of the armature 5 in a box shape, the flange 11 formed by bending an edge portion of the cooling jacket 8 by 90 degrees is integrally molded with carbon fiber reinforced plastics (CFRP), and the flange 11 of the cooling jacket 8 is fixed to the base 6 with the screws 12.

The integral molding of the cooling jacket 8 with the CFRP (carbon fiber) enables to increase the strength. Specifically, the carbon fiber is arranged in such a manner that the direction of the carbon fiber matches a direction perpendicular to the direction of the thrust force in each corner to increase the rigidity, so that the mass of the armature 5 can be sufficiently maintained even if a posture of the armature 5 is changed to the lateral direction. With this configuration, the base 6 can transfer the thrust force generated by the armature coil 7 to outside.

Alternatively, as a connection structure to connect the box-shaped cooling jacket 8 and the base 6 of a single plate shape, it is possible to adhesively fix the flange 11 with another member and fix the cooling jacket 8 to the base 6 with the screws 12 via the flange 11. Another approach is to simply bond the cooling jacket 8 to the base 6 and then fix the cooling jacket 8 with the screws 12 without using the flange 11 as a connection portion to connect the cooling jacket 8 and the base 6. In any of the above cases, the base 6 can transfer the thrust force generated by the armature coil 7 to outside in the similar manner.

In the first embodiment, the cooling jacket 8 is formed in a thin plate shape and has multiple channels through which the refrigerant is supplied in the thickness direction (a direction of transferring heat to the surface), particularly a configuration of two layers including the inner refrigerant channels 13a and the outer refrigerant channels 13b as shown in FIG. 3. The base 6 including the refrigerant inlet 9a and the refrigerant outlet 9b shown in FIG. 2 for introducing and discharging the refrigerant is provided to the cooling jacket 8 that includes the inner refrigerant channels 13a and the outer refrigerant channels 13b shown in FIG. 3, where each of the refrigerant inlet 9a and the refrigerant outlet 9b is communicated with the inner refrigerant channels 13a and the outer refrigerant channels 13b. In operation, the refrigerant introduced from the refrigerant inlet 9a is branched and flows into the inner refrigerant channels 13a and the outer refrigerant channels 13b and discharged to outside from the refrigerant outlet 9b.

More specifically, the refrigerant flowing through the inner refrigerant channels 13a near the armature coil 7 is used to collect heat generated by the armature coil 7 in the same way as the conventional technique. The refrigerant flowing through the outer refrigerant channels 13b near the surface of the linear motor 1 can collect a small amount of heat that is not collected by the refrigerant flowing through the inner refrigerant channels 13a, and at the same time, can achieve a shield effect to keep a surface temperature of the linear motor 1 at the temperature of the introduced refrigerant, so-called, a surface-temperature suppressing effect.

As explained above, the armature 5 according to the first embodiment can divide the channels of the cooling jacket 8 into heat collecting channels through which the refrigerant for collecting the heat flows and surface-temperature suppressing channels through which the refrigerant for suppressing the surface temperature flows by providing dual-layer (multilayer) channels in the thickness direction, thereby enabling to greatly suppress an increase in the surface temperature of the linear motor 1. As a result, because the increase in the surface temperature of the armature 5 can be suppressed even when an increase of the thrust force is aimed with a similar linear motor size, it is possible to enhance the cooling efficiency and prevent a deformation due to a refrigerant pressure. Furthermore, this also enables to obtain a linear motor armature that can be manufactured easily and inexpensively. In addition, because a jacket structure with built-in channels incorporating the dual-layer channels is employed, the dual-layer channels are separated from each other, so that they are hardly affected by an internal pressure, thereby enabling to cope with a high-pressure specification produced by an increased flow rate.

A modification of the first embodiment is explained below.

FIG. 4 is a front cross-sectional view of a linear motor armature according to a modification of the first embodiment. The linear motor armature according to the modification has basically the same configuration as that shown in FIGS. 2 and 3 of the first embodiment, however, is different in that cross sections of the channels are changed from a conventional rectangular shape to a trapezoidal shape without providing the dual-layer channels in the cooling jacket 8 in the thickness direction.

The inner refrigerant channels 13a are formed in such a manner that a side close to the armature coil 7 is longer and a side close to the surface of the linear motor is shorter. Therefore, the refrigerant flowing through the inner refrigerant channels 13a has a larger heat collecting effect for the armature coil 7 and smaller heat transfer to the surface of the linear motor. On the other hand, the outer refrigerant channels 13b are formed in such a manner that a side close to the armature coil 7 is shorter and a side close to the surface of the linear motor is longer. Therefore, the refrigerant flowing through the outer refrigerant channels 13b has a small thermal influence from the armature coil 7 and a large suppressing effect against an increase in the surface temperature. This enables to obtain an equivalent effect to the case in which the channels incorporated in the cooling jacket 8 are two-layered in the thickness direction.

As explained above, the armature 5 according to the modification of the embodiment can greatly suppress the increase in the surface temperature of the linear motor 1 by changing the cross sections of the channels from the conventional rectangular shape to the trapezoidal shape.

A second embodiment is explained below.

Figure 5A:
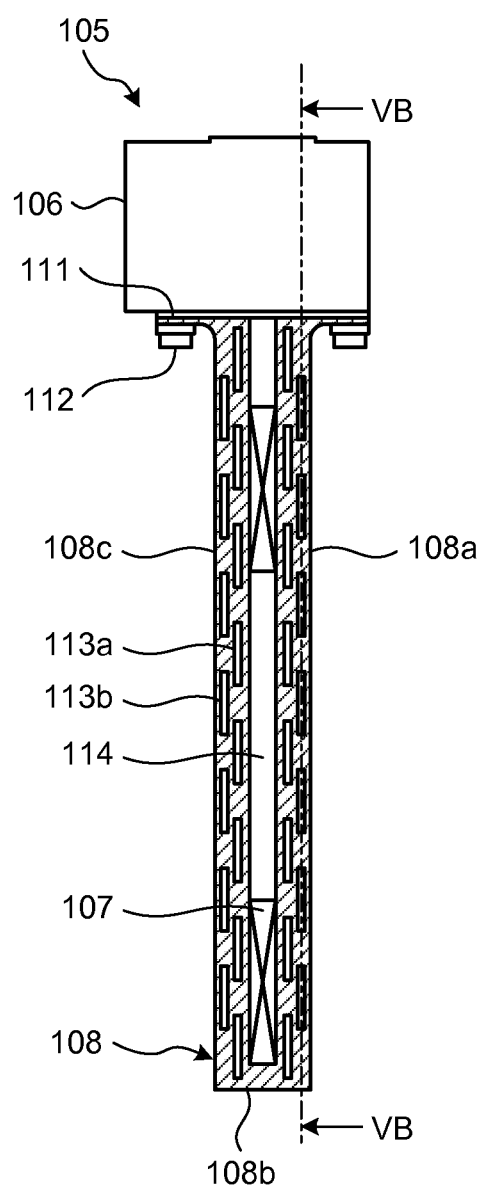
FIG. 5A is a front cross-sectional view of a linear motor armature according to a second embodiment.
Figure 5B:
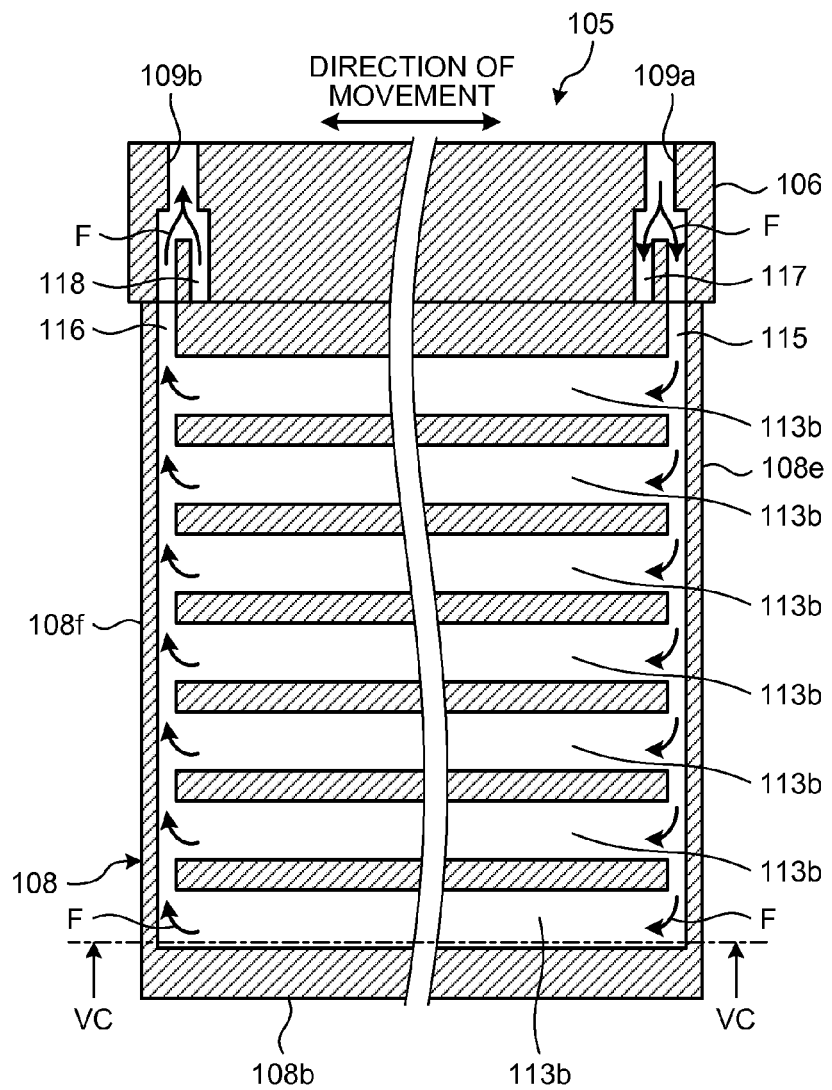
FIG. 5B is a side cross-sectional view cut along a line VB-VB shown in FIG. 5A.
Figure 5C:
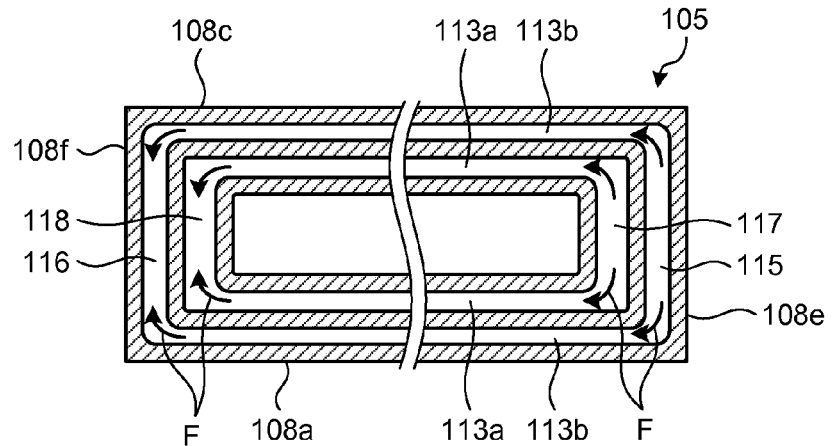
FIG. 5C is a horizontal cross-sectional view cut along a line VC-VC shown in FIG. 5B.

FIG. 5A is a front cross-sectional view of a linear motor armature according to the second embodiment. FIG. 5B is a side cross-sectional view cut along a line VB-VB shown in FIG. 5A. FIG. 5C is a horizontal cross-sectional view cut along a line VC-VC shown in FIG. 5B.

A linear motor 100 (not shown) according to the second embodiment has the same configuration as the linear motor 1 according to the first embodiment except for an armature 105 (explained below).

As shown in FIG. 5A, the armature 105 includes a flange 111, screws 112, inner refrigerant channels 113a, and outer refrigerant channels 113b. Like the armature 5 according to the first embodiment, the armature 105 further includes an armature coil 107, a cooling jacket 108 that includes channels therein, and a base 106. The armature coil 107 is integrated with the cooling jacket 108 by being fixed with a resin mold 114 or bonded with a bonding adhesive (not shown) to be closely attached to an inner side of the cooling jacket 108.

The cooling jacket 108 is formed in a box shape with two surfaces (cooling jackets 108e and 108f) perpendicular to the movement direction of the armature 105 and three surfaces (cooling jackets 108a, 108b, and 108c) parallel to the movement direction of the armature 105. Furthermore, as shown in FIG. 5A, the flange 111 formed by bending surfaces of upper edge portions of the cooling jackets 108a, 108c, 108e, and 108f forming side surfaces of the cooling jacket 108 by 90 degrees is integrally molded with the CFRP (carbon fiber), and the flange 111 is fixed to the base 106 with the screws 112.

The cooling jacket 108 is, like in the armature 5 according to the first embodiment, formed in a thin plate shape having a structure in which a channel through which a refrigerant is supplied is divided into multiple channels in the thickness direction, that is, a structure in which the channel is divided into two layers of the inner refrigerant channels 113a and the outer refrigerant channels 113b as shown in FIGS. 5A and 5C. The inner refrigerant channels 113a and the outer refrigerant channels 113b are connected in parallel so that the refrigerant flows in the same direction in the channels (indicated by arrows F in FIGS. 5B and 5C).

Specifically, as shown in FIGS. 5B and 5C, the plural (seven in the example shown in FIGS. 5A to 5C) outer refrigerant channels 113b are communicated with a first inlet-side channel 115 at an inlet side and with a first outlet-side channel 116 at an outlet side. Similarly, the plural (eight in the example shown in FIGS. 5A to 5C) inner refrigerant channels 113a are communicated with a second inlet-side channel 117 at the inlet side and with a second outlet-side channel 118 at the outlet side. The first inlet-side channel 115 and the second inlet-side channel 117 are communicated with each other in the base 106, which is then communicated with a refrigerant inlet 109a provided on the upper surface of the base 106. Similarly, the first outlet-side channel 116 and the second outlet-side channel 118 are communicated with each other in the base 106, which is then communicated with a refrigerant outlet 109b provided on the upper surface of the base 106.

With the above configuration, the first outlet-side channel 116 that is at the outlet side of the outer refrigerant channels 113b and the second outlet-side channel 118 that is at the outlet side of the inner refrigerant channels 113a are not joined together in the cooling jacket 108. Although the first inlet-side channel 115 that is at the inlet side of the outer refrigerant channel 113b and the second inlet-side channel 117 that is at the inlet side of the inner refrigerant channel 113a are connected in the base 106 in the example shown in FIG. 5B, the first inlet-side channel 115 and the second inlet-side channel 117 at the inlet side can be alternatively connected in the cooling jacket 108.

An effect of the second embodiment described above is explained.

In the armature 105, like in the armature 5 according to the first embodiment, the channel of the cooling jacket 108 includes the inner refrigerant channels 113a and the outer refrigerant channels 113b, providing a two-layer configuration in the thickness direction. The refrigerant flowing through the inner refrigerant channels 113a near the armature coil 107 is used to collect the heat generated by the armature coil 107. The refrigerant flowing through the outer refrigerant channels 113b near the surface of the linear motor 100 collects a small amount of heat that is not collected by the refrigerant flowing through the inner refrigerant channels 113a, and at the same time, keeps a surface temperature of the linear motor 100 at the temperature of the introduced refrigerant, thereby suppressing an increase in the surface temperature.

In this case, because the refrigerant flowing through the second outlet-side channel 118 that is at the outlet side of the inner refrigerant channels 113a has a larger amount of heat absorption than the refrigerant flowing through the first outlet-side channel 116 that is at the outlet side of the outer refrigerant channel 113b, its temperature is higher. Therefore, if the structure is adapted in such a manner that the first outlet-side channel 116 and the second outlet-side channel 118 are joined together in the cooling jacket 108, the temperature of the refrigerant flowing through the outer refrigerant channels 113b (the first outlet-side channel 116) for suppressing the surface temperature of the linear motor 100 is increased by the joining. As a result, the surface temperature of the linear motor 100 near the refrigerant outlet may be increased compared to those in the other areas. If such an increase of the surface temperature occurs, there is a fear that devices around the linear motor 100 are affected. To cope with this problem, in the second embodiment, the first outlet-side channel 116 and the second outlet-side channel 118 are not joined together in the cooling jacket 108 as described above, by which the increase in the surface temperature of the linear motor 100 near the refrigerant outlet can be suppressed, and eventually the reliability of the linear motor 100 can be enhanced.

Particularly in the second embodiment, the first outlet-side channel 116 and the second outlet-side channel 118 are joined together in the base 106, thereby surely realizing the structure in which the channels 116 and 118 are not joined in the cooling jacket 108, and at the same time, simplifying the structure because only a single refrigerant outlet 109b needs to be provided in the base 106.

A modification of the second embodiment is explained below.

Figure 6:
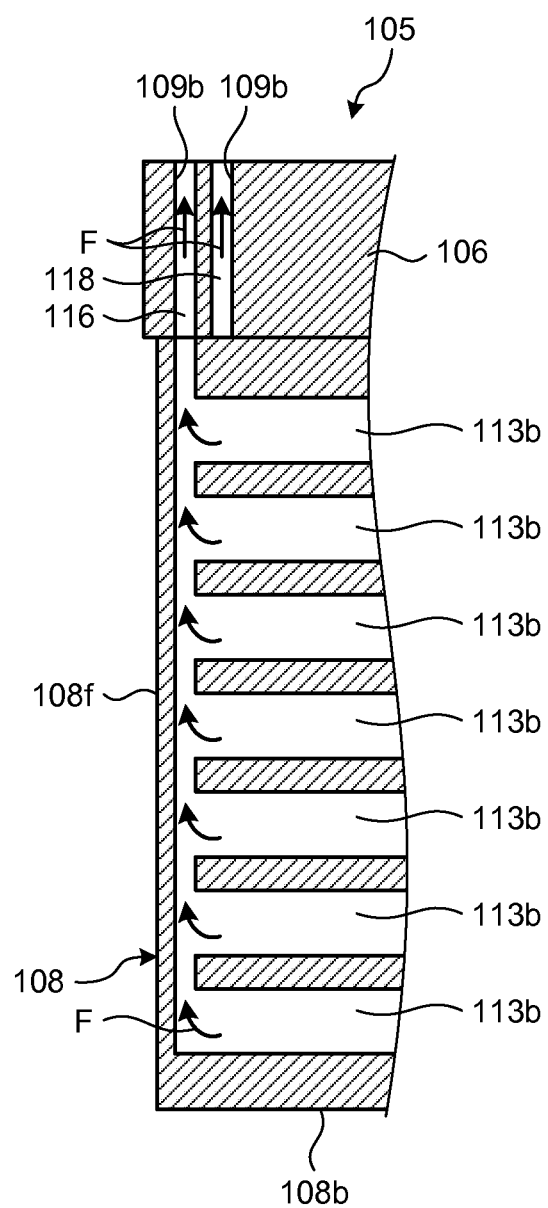
FIG. 6 is a side cross-sectional view of a linear motor armature according to a modification of the second embodiment.

FIG. 6 is a side cross-sectional view of a linear motor armature according to a modification of the second embodiment, corresponding to the cross section cut along the line VB-VB shown in FIG. 5A and partially showing the refrigerant outlet side only.

As shown in FIG. 6, in the armature 105 according to the modification of the second embodiment, two refrigerant outlets 109b and 109b through which the refrigerant flows out are provided in the base 106. The first outlet-side channel 116 that is at the outlet side of the outer refrigerant channels 113b and the second outlet-side channel 118 that is at the outlet side of the inner refrigerant channels 113a are communicated with the two refrigerant outlets 109b and 109b, respectively. That is, in the modification of the second embodiment, the first outlet-side channel 116 and the second outlet-side channel 118 are joined together neither in the cooling jacket 108 nor in the base 106.

According to the modification of the second embodiment having the above configuration, because the structure can be realized in which the first outlet-side channel 116 and the second outlet-side channel 118 are not joined together in the base 106 or in the cooling jacket 108, the increase in the surface temperature of the linear motor 100 near the refrigerant outlet can be further suppressed, and eventually the reliability of the linear motor 100 can be further enhanced.

A third embodiment is explained below.

Figure 7A:
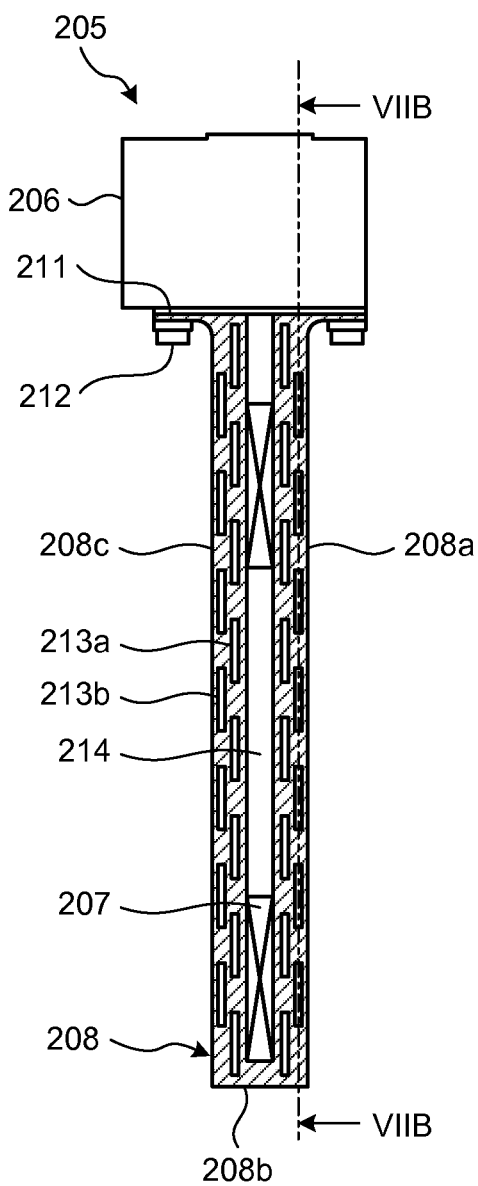
FIG. 7A is a front cross-sectional view of a linear motor armature according to a third embodiment.
Figure 7B:
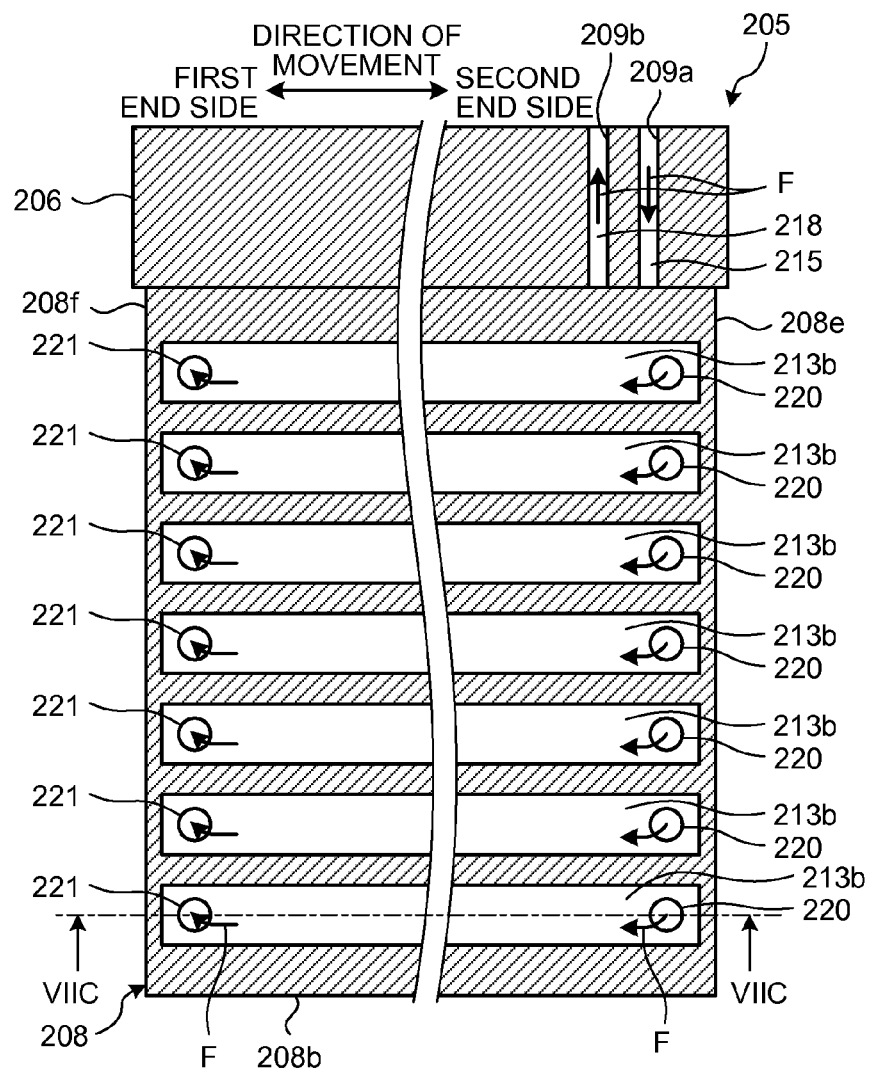
FIG. 7B is a side cross-sectional view cut along a line VIIB-VIIB shown in FIG. 7A.
Figure 7C:
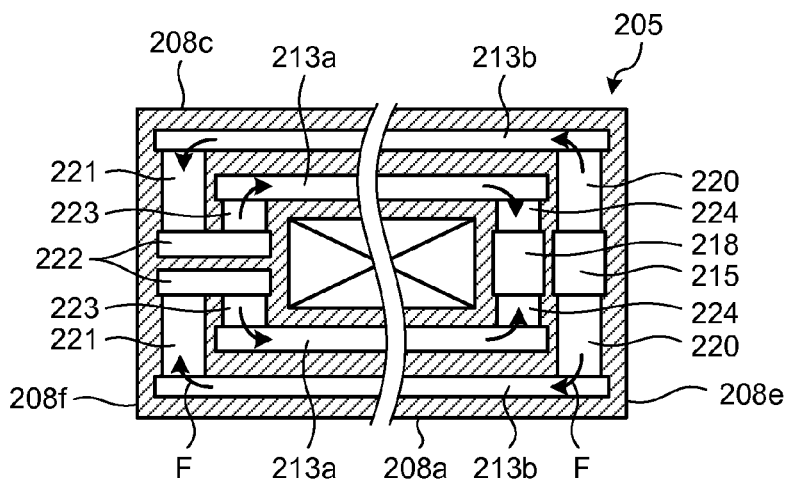
FIG. 7C is a horizontal cross-sectional view cut along a line VIIC-VIIC shown in FIG. 7B.

FIG. 7A is a front cross-sectional view of a linear motor armature according to the third embodiment. FIG. 7B is a side cross-sectional view cut along a line VIIB-VIIB shown in FIG. 7A. FIG. 7C is a horizontal cross-sectional view cut along a line VIIC-VIIC shown in FIG. 7B.

A linear motor 200 (not shown) according to the third embodiment has the same configuration as the linear motor 1 according to the first embodiment except for an armature 205 (explained below). Although the armature 205 of the third embodiment is different from the armature 105 of the second embodiment in a configuration of a refrigerant channel, explanations thereof will be omitted because it has the same configuration as the armature 105 except for the refrigerant channel.

A cooling jacket 208 is, like in the armature 105 according to the second embodiment, formed in a thin plate shape having a structure in which a channel through which a refrigerant is supplied is divided into multiple channels in the thickness direction, that is, a structure in which the channel is divided into two layers of inner refrigerant channels 213a and outer refrigerant channels 213b as shown in FIGS. 7A and 7C. The inner refrigerant channels 213a and the outer refrigerant channels 213b are connected in series in such a manner that the flowing directions of the refrigerant in the channels (indicated by arrows F in FIGS. 7B and 7C) are made opposite to each other by folding the channel back at a first end side (the left end side in FIGS. 7B and 7C) in the movement direction of the linear motor 200 in the cooling jacket 208. The outer refrigerant channels 213b are arranged on the upstream side, and the inner refrigerant channels 213a are arranged on the downstream side.

Specifically, as shown in FIGS. 7B and 7C, a communication hole 220 is provided to each of the plural (seven in the example shown in FIGS. 7A to 7C) outer refrigerant channels 213b at a second end side (the right end side in FIGS. 7B and 7C) in the movement direction, and each communication hole 220 is communicated with an inlet-side channel 215. The inlet-side channel 215 is communicated with a refrigerant inlet 209a provided on the upper surface of a base 206. On the other hand, a communication hole 221 is provided to each of the outer refrigerant channels 213b at the first end side in the movement direction, and each communication hole 221 is communicated with a connection channel 222. The connection channel 222 is a channel for connecting the outer refrigerant channel 213b and the inner refrigerant channel 213a.

Similarly, a communication hole 223 is provided to each of the plural (eight in the example shown in FIGS. 7A to 7C) inner refrigerant channels 213a at the first end side in the movement direction, and each communication hole 223 is communicated with the connection channel 222. On the other hand, a communication hole 224 is provided to each of the inner refrigerant channels 213a at the second end side in the movement direction, and each communication hole 224 is communicated with an outlet-side channel 218. The outlet-side channel 218 is communicated with a refrigerant outlet 209b provided on the upper surface of the base 206.

The outer refrigerant channels 213b and the inner refrigerant channels 213a are arranged alternately in a height direction (the vertical direction in FIG. 7A). Therefore, the connection channels 222 connect the outer refrigerant channels 213b and the inner refrigerant channels 213a in such a manner that the refrigerant inflowing from one outer refrigerant channel 213b is divided into two inner refrigerant channels 213a located at both sides in the height direction, for example.

As shown in FIG. 7B, the refrigerant inlet 209a and the refrigerant outlet 209b are provided at the second end side (the right end side in FIGS. 7B and 7C) of the base 206 in the movement direction of the linear motor 200, where the refrigerant outlet 209b is located at an inner side than the refrigerant inlet 209a in the thickness direction of a cooling jacket 208e.

In the armature 205 having the above configuration, the refrigerant introduced into the cooling jacket 208 through the refrigerant inlet 209a provided in the base 206 flows through the outer refrigerant channels 213b on the upstream side via the inlet-side channel 215 and the communication holes 220, and then passes through the inner refrigerant channels 213a on the downstream side via the communication holes 221, the connection channels 222, and the communication holes 223. After that, the refrigerant passes through the communication holes 224 and the outlet-side channel 218 and then is discharged to outside through the refrigerant outlet 209b provided in the base 206.

An effect of the third embodiment described above is explained.

In the armature 205 according to the third embodiment, the outer refrigerant channels 213b and the inner refrigerant channels 213a are connected in series by folding the channel of the cooling jacket 208 back at the first end side of the cooling jacket 208 in the movement direction of the linear motor 200. The outer refrigerant channels 213b are arranged on the upstream side, and the inner refrigerant channels 213a are arranged on the downstream side. With this configuration, the refrigerant first flows through the outer refrigerant channels 213b on the upstream side to keep the surface temperature of the linear motor 200 at the temperature of the refrigerant, and flows through the inner refrigerant channels 213a on the downstream side to collect the heat generated by an armature coil 207. In this manner, because it is possible to flow the refrigerant introduced into the cooling jacket 208 through the outer refrigerant channels 213b first, the increase in the surface temperature of the linear motor 200 can be suppressed. Furthermore, because the outer refrigerant channels 213b and the inner refrigerant channels 213a are connected in series, the refrigerant having the temperature increased by having flowed through the inner refrigerant channels 213a never flows in the outer refrigerant channels 213b in the cooling jacket 208. Therefore, it is possible to surely suppress the increase in the surface temperature of the linear motor 200, thereby enabling to enhance the reliability of the linear motor 200.

Particularly in the third embodiment, the refrigerant outlet 209b is arranged on the inner side than the refrigerant inlet 209a in the thickness direction of the cooling jacket 208e at the second end side of the base 206 in the movement direction. With this arrangement, as shown in FIG. 7C, the outlet-side channel 218 communicated with the refrigerant outlet 209b can be arranged on the inner side than the inlet-side channel 215 communicated with the refrigerant inlet 209a. As a result, because the refrigerant having the temperature increased by having flowed through the inner refrigerant channels 213a never flows near the surface of the linear motor 200, the increase in the surface temperature of the linear motor 200 can be surely suppressed.

Embodiments are not limited to the first to third embodiments and the modifications thereof, and various other modifications can be made without departing from the spirit and technical idea of the present embodiment.

For example, in the above descriptions, explanations are given with the linear motor 1 as an example, in which the field system 2 is set to the stator and the armature 5 and the like are set to the mover. However, the above embodiments can also be applied to a linear motor with the armature 5 and the like as the stator and the field system 2 as the mover. Also in this case, the same effect can be obtained.

In addition to the methods already described, the methods according to the embodiments or modifications can be appropriately combined and used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The following aspects of the embodiments are also disclosed.

(1) A linear motor armature comprising an armature coil and a cooling jacket that is provided to surround the armature coil and that has an internal space into which a refrigerant is supplied, wherein
the cooling jacket is formed in a thin plate shape having a structure in which a channel for supplying the refrigerant is provided in a multiple manner in its thickness direction.

(2) The linear motor armature according to (1), wherein the channel of the cooling jacket is formed in two layers including an inner refrigerant channel and an outer refrigerant channel.

(3) The linear motor armature according to (1) or (2), wherein a cross-sectional shape of the channel of the cooling jacket is trapezoidal.

(4) The linear motor armature according to (1) or (2), wherein the cooling jacket includes a refrigerant inlet and a refrigerant outlet for flowing the refrigerant at both ends in a direction of movement of a linear motor, respectively.

(5) The linear motor armature according to (1) or (2), further comprising a base of a plate shape, instead of the cooling jacket, provided on one of four surfaces of the cooling jacket parallel to a direction of movement of a linear motor.

(6) The linear motor armature according to (5), further comprising a flange at a connection portion connecting the base and the cooling jacket.

(7) The linear motor armature according to (5) or (6), wherein the base and the connection portion of the cooling jacket are fixed with a screw.

(8) The linear motor armature according to (6), wherein the cooling jacket and the flange are formed in an integral manner with carbon fiber.

(9) The linear motor armature according to (2), wherein
the inner refrigerant channel and the outer refrigerant channel are connected in parallel in such a manner that the refrigerant flows in a same direction in the channels, and
the cooling jacket is configured in such a manner that a first outlet-side channel that is at an outlet side of the outer refrigerant channel and a second outlet-side channel that is at an outlet side of the inner refrigerant channel are not joined together in the cooling jacket.

(10) The linear motor armature according to (9), further comprising a base of a plate shape, instead of the cooling jacket, provided on one of four surfaces of the cooling jacket parallel to the direction of movement of the linear motor, wherein
the first outlet-side channel and the second outlet-side channel are joined together in the base.

(11) The linear motor armature according to (9), further comprising a base of a plate shape, instead of the cooling jacket, provided on one of four surfaces of the cooling jacket parallel to the direction of movement of the linear motor, wherein
the base includes two refrigerant outlets for discharging the refrigerant, and
the first outlet-side channel and the second outlet-side channel are communicated with the two refrigerant outlets, respectively.

(12) The linear motor armature according to (2), wherein
the outer refrigerant channel and the inner refrigerant channel are connected in series so that flowing directions of the refrigerant in the channels are made opposite to each other by folding the channel of the cooling jacket back at a first end side of the cooling jacket in a direction of movement of a linear motor, and
the outer refrigerant channel is arranged on an upstream side, and the inner refrigerant channel is arranged on a downstream side.

(13) The linear motor armature according to (12), further comprising a base of a plate shape, instead of the cooling jacket, provided on one of four surfaces of the cooling jacket parallel to the direction of movement of the linear motor, wherein
the base includes a refrigerant inlet for inflowing the refrigerant and a refrigerant outlet for discharging the refrigerant at a second end side of the cooling jacket in the direction of movement of the linear motor, and
the refrigerant outlet is arranged on an inner side than the refrigerant inlet in a thickness direction of the cooling jacket.

(14) A linear motor comprising:
the linear motor armature according to any one of (1) to (13); and
a field system arranged facing the linear motor armature via a magnetic gap and formed by arranging a plurality of permanent magnets on a yoke made of a ferromagnetic material.

The invention claimed is:

1. A linear motor armature comprising:
an armature coil; and
a cooling jacket that has a plate-shaped outer wall provided to surround the armature coil, the outer wall having therein channels for supplying refrigerant and each of the channels having sub channels.

2. The linear motor armature according to claim 1, wherein
a number of the channels is two, and
the two channels of the cooling jacket are an inner refrigerant channel and an outer refrigerant channel that are located respectively inside and outside in the outer wall in a thickness direction of the outer wall.

3. The linear motor armature according to claim 2, wherein the cooling jacket includes a refrigerant inlet and a refrigerant outlet for flowing the refrigerant at both ends in a movement direction of the armature coil, respectively.

4. The linear motor armature according to claim 2, further comprising a base of a plate shape, instead of the cooling jacket, provided on one of four surfaces of the cooling jacket parallel to a movement direction of the armature coil.

5. The linear motor armature according to claim 2, wherein
the inner refrigerant channel and the outer refrigerant channel are connected in parallel in such a manner that the refrigerant flows in a same direction in the channels, and
the cooling jacket is configured in such a manner that a first outlet-side channel that is at an outlet side of the outer refrigerant channel and a second outlet-side channel that is at an outlet side of the inner refrigerant channel are not joined together in the cooling jacket.

6. The linear motor armature according to claim 5, further comprising a base of a plate shape, instead of the cooling jacket, provided on one of four surfaces of the cooling jacket parallel to a movement direction of the armature coil, wherein
the first outlet-side channel and the second outlet-side channel are joined together in the base.

7. The linear motor armature according to claim 5, further comprising a base of a plate shape, instead of the cooling jacket, provided on one of four surfaces of the cooling jacket parallel to a movement direction of the armature coil, wherein the base includes two refrigerant outlets for discharging the refrigerant, and the first outlet-side channel and the second outlet-side channel are communicated with the two refrigerant outlets, respectively.

8. The linear motor armature according to claim 2, wherein
the outer refrigerant channel and the inner refrigerant channel are connected in series so that flowing directions of the refrigerant in the channels are made opposite to each other by folding the channel of the cooling jacket back at a first end side of the cooling jacket in a movement direction of the armature coil, and the outer refrigerant channel is arranged on an upstream side, and the inner refrigerant channel is arranged on a downstream side.

9. The linear motor armature according to claim 8, further comprising a base of a plate shape, instead of the cooling jacket, provided on one of four surfaces of the cooling jacket parallel to the movement direction of the armature coil, wherein the base includes a refrigerant inlet for inflowing the refrigerant and a refrigerant outlet for discharging the refrigerant at a second end side of the cooling jacket in the movement direction the armature coil, and the refrigerant outlet is arranged on an inner side than the refrigerant inlet in a thickness direction of the cooling jacket.

10. The linear motor armature according to claim 1, wherein
a number of the channels is two, and
cross-sectional shapes of the two channels of the cooling jacket are symmetric trapezoidal.

11. The linear motor armature according to claim 10, wherein one of the two channels has the cross-sectional shape whose outside length is larger than its inside length and another of the two channels has the cross-sectional shape whose inside length is larger than its outside length.

12. The linear motor armature according to claim 1, wherein the cooling jacket includes a refrigerant inlet and a refrigerant outlet for flowing the refrigerant at both ends in a movement direction of the armature coil, respectively.

13. The linear motor armature according to claim 1, further comprising a base of a plate shape, instead of the cooling jacket, provided on one of four surfaces of the cooling jacket parallel to a movement direction of the armature coil.

14. The linear motor armature according to claim 1, wherein the sub channels of each of the channels are arranged in a direction perpendicular to a thickness direction of the outer wall and a movement direction of the armature coil.

15. The linear motor armature according to claim 1, wherein the armature coil is closely attached to inner sides of the outer wall of the cooling jacket.

16. A linear motor armature, comprising:
an armature coil;
a cooling jacket that is provided to surround the armature coil and that has an internal space into which a refrigerant is supplied, wherein the cooling jacket is formed in a thin plate shape having a structure in which a channel for supplying the refrigerant is provided in a multiple manner in its thickness direction; and
a base of a plate shape, instead of the cooling jacket, provided on one of four surfaces of the cooling jacket parallel to a direction of movement of a linear motor; and
a flange at a connection portion connecting the base and the cooling jacket.

17. The linear motor armature according to claim 16, wherein the connection portion connecting the base and the cooling jacket is fixed with a screw.

18. The linear motor armature according to claim 16, wherein the cooling jacket and the flange are formed in an integral manner with carbon fiber.

19. A linear motor comprising:
a linear motor armature including an armature coil and a cooling jacket that has plate-shaped outer wall provided to surround the armature coil, the outer wall having therein channels for supplying refrigerant and each of the channels having sub channels; and
a field system arranged facing the linear motor armature via a magnetic gap and formed by arranging a plurality of permanent magnets on a yoke made of a ferromagnetic material.

20. The linear motor armature according to claim 1, wherein the cooling jacket is provided to surround the armature coil by connecting three surfaces parallel to a movement direction of the armature coil and two surfaces perpendicular to the movement direction.

* * * * *